UNITED STATES PATENT OFFICE.

JOSEPH F. RUMSEY, OF OKLAHOMA, OKLAHOMA.

FOOD PRODUCT AND PROCESS OF MAKING SAME.

1,348,186.   Specification of Letters Patent.   Patented Aug. 3, 1920.

No Drawing.   Application filed April 19, 1917.   Serial No. 163,270.

*To all whom it may concern:*

Be it known that I, JOSEPH F. RUMSEY, a citizen of the United States, residing at Oklahoma city, in the county of Oklahoma and State of Oklahoma, have invented certain new and useful Improvements in Food Products and Processes of Making Same, of which the following is a specification.

The present invention relates to a food product and to a method of preparing the same, and has for its object the production of a food which shall be highly nutritious, and highly concentrated, at a relatively low price. A further object is to produce a food product which will represent a properly balanced ration, so that it may constitute the bulk of a person's diet.

In its preferred form my invention comprises the use of cotton seed flour, prepared from high grade cotton seed meal bolted, which may be employed in varying amounts of from 30 to 70%, depending upon the particular nature of the product desired. In the preferred form of the invention I preferably use about 65% of the cotton seed flour.

To this I add low grade wheat flour in amount sufficient to furnish the necessary dough-producing properties, it being a well recognized fact that the proteids of wheat flour are somewhat different in this respect from the proteids of any of the other ordinary kinds of flour. Using a rather low grade of wheat flour, I find that about 21.5% is a good amount of flour to use.

To the two ingredients above mentioned I add sugar 8%, salt 1.5%, bone phosphate (tricalcium phosphate, preferably in the form of a flour) 2%, sodium bicarbonate 2%, to which materials I preferably add a small amount of molasses, say about two teaspoonfuls to about each pound of the mixture.

In some instances I prefer to add to the above ingredients, or to the mixture thereof, corn flour or fine corn meal. This material may be added to the extent of 35%, more or less.

I then add water in amounts sufficient to produce a dough of ordinary consistency, and then roll up the product into biscuits, which may be about the size and shape of finger-rolls.

These biscuits are then baked, which baking produces certain changes in the proteids and carbohydrates of the material, but the product of this baking step has been found not to be entirely suitable for use as a food, perhaps on account of the fact that the proteids are not sufficiently altered by a single baking.

These biscuits are accordingly ground up, for example by passing the same through an ordinary meat grinder, after which the coarse flour or meal being in a more or less granular condition is again mixed with a small amount of water, and is then made up into cakes, for example by rolling out the mixture on a bread-board, and these cakes are then baked in a moderately hot oven for about 15 minutes. Care must be taken in both the baking operations not to overheat the material, since on account of its high content of proteids, it is liable to be injured by overheating.

In certain conditions it is found to be advisable to cut down the proteid ingredients of the mass, and this can be easily accomplished by the addition of rice flour, in any desired quantity. This rice flour also has the advantage of making the final product a little less dense, or in other words more fluffy or lighter.

By the process above described, there is produced a food product in which the proportions of the essential food elements can very readily be proportioned to suit the particular conditions, and a food product is produced which is highly concentrated and accordingly suitable for use where food has to be carried for long distances. It is thus suitable for use in the army and in camps, and on account of the nature of the materials employed, and the manner in which it is prepared, the ingredients thereof are to a very great extent digestible. The food is also highly palatable, although if desired, any suitable seasoning materials may be added to meet particular requirements. The food can also be kept for a long period of time, without deterioration, although if kept for a long period, it is advisable to "freshen-up" the food by heating in an oven before serving.

What I claim is:

1. A process of making a food product which comprises making a dough comprising cotton seed flour, and cereal flour, baking the same, comminuting the product, moistening the product, making the same into cakes and again baking.

2. The herein described process which comprises baking a dough containing cotton seed flour, and flour of starchy grains, coarsely grinding, again mixing with water and again baking.

3. A twice baked and readily digestible food product containing cotton seed flour and starchy flour, the amount of cotton seed flour being between 30% and 70% of the entire mass, said product having been first baked, reduced to a granular mass, mixed with water and rebaked and having substantially all of its proteids in a readily digestible and assimilable condition.

In testimony whereof I affix my signature in presence of two witnesses.

JOSEPH F. RUMSEY.

Witnesses:
  B. F. HENDRIX,
  JOHN R. HUBER.